United States Patent Office 3,318,924
Patented May 9, 1967

3,318,924
17α-CYCLOPROPYLTESTOSTERONES
Vlasios Georgian, Belmont, Mass., assignor to Trustees of Tufts College, Medford, Mass., a corporation of Massachusetts
No Drawing. Filed Jan. 6, 1965, Ser. No. 423,821
8 Claims. (Cl. 260—397.4)

This invention relates to novel 17-substituted testosterone derivatives and more specifically to 17α-cyclopropyltestosterones. These compounds have anabolic-androgenic, anti-inflammatory and hypocholesteremic activity.

The compounds of this invention may be represented by the following general structural formula:

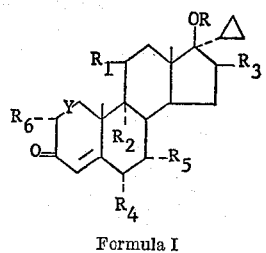

Formula I in which:

Y represents a single or double bond;
R represents hydrogen or an acyl group of from 2 to 4 carbon atoms;
$R_1$ represents hydrogen, hydroxy or keto;
$R_2$ represents hydrogen or fluoro; and
$R_3$, $R_4$, $R_5$ and $R_6$ represent hydrogen or methyl.

Exemplary of preferred acyl groups are those derived from a lower aliphatic carboxylic acid such as acetyl or propionyl.

The novel testosterone derivatives of this invention generally are prepared by methods employing known starting materials. In one method, a dehydroepiandrosterone is reacted with lithium cyclopropylbromide in an anhydrous solvent such as tetrahydrofuran to give a 17α-cyclopropyl-5-androstene3β,17β-diol which in turn is oxidized under Oppenauer conditions (aluminum isopropoxide-cyclohexanone) to give the 17α-cyclopropyltestosterone derivative. This method may be illustrated by the following reaction sequence:

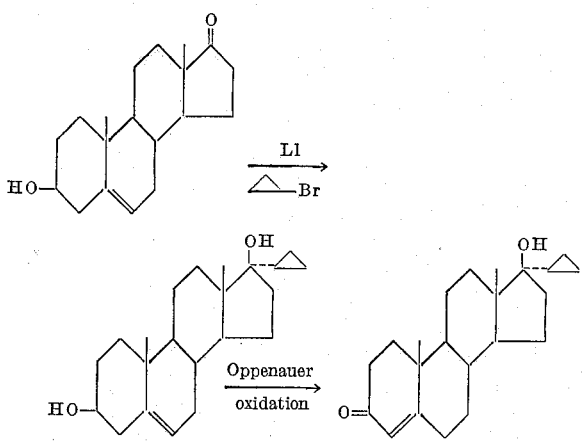

In a second method, a 4-androstene-3,17-dione is converted to a 3-enamine derivative by treatment with pyrrolidine or morpholine in for example a methanolic, ethanolic or acetone solution which is then similarly reacted with lithium cyclopropylbromide. The resulting 17α-cyclopropyl substituted 3-enamine is then cleaved by heating with a mixture of acetic acid, methanol and sodium acetate to give the 17α-cyclopropyltestosterone derivative.

This method may be illustrated by the following reaction sequence:

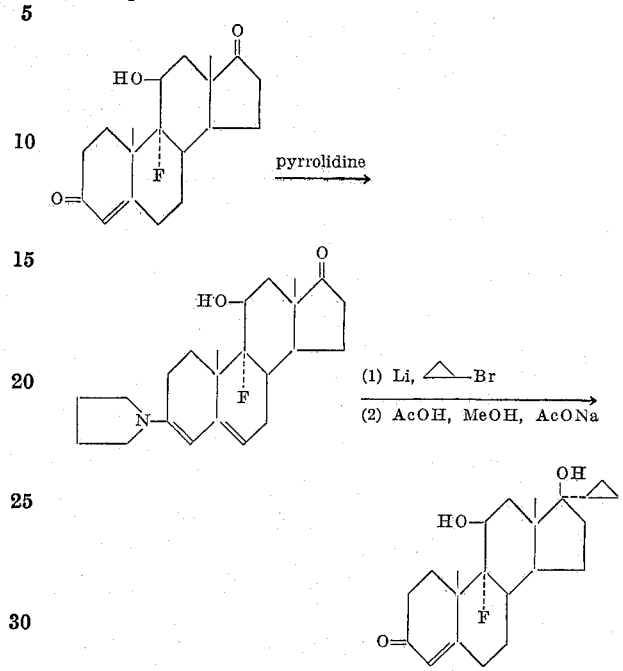

The compounds of Formula I wherein Y is a double bond are advantageously prepared by oxidation of the 17α-cyclopropyltestosterones with preferably dichlorodicyanoquinone.

The compounds of Formula I where R is an acyl group are prepared by reacting the 17α-cyclopropyltestosterone derivative with the corresponding acid anhydride.

The following examples illustrate the methods of preparation described above but are not intended to limit the scope of this invention.

Example 1

Lithium metal (1.38 g.) in 25 ml. of anhydrous ether is treated with 12.1 g. of cyclopropylbromide diluted with 10–20 ml. of anhydrous ether. The resulting solution is stirred for one hour and refluxed one hour. The ether is removed by distillation and replaced with anhydrous tetrahydrofuran. To this solution is added dropwise 5.76 g. of dehydroepiandrosterone in 100 ml. of tetrahydrofuran and the mixture is refluxed for 12 hours. The excess lithium metal is cautiously destroyed with several milliliters of cold methanol in an ice-bath and the reaction mixture is poured into water. The aqueous phase is slightly acidified with dilute hydrochloric acid and the solid material is collected and dried. The aqueous phase is also extracted with methylene chloride to isolate additional product. The total crude product is purified by passage through a Florisil column in 10% methanol-methylene chloride solution to yield 17α-cyclopropyl-5-androstene-3β,17β-diol, M.P. 176–178° C.

Example 2

A solution of 4.5 g. of 17α-cyclopropyl-5-androstene-3β,17β-diol (prepared as in Example 1) in 400 ml. of toluene is azeotroped to dryness and then is treated with 4.3 g. of aluminum isopropoxide and 21.6 ml. of distilled cyclohexanone. The mixture is refluxed for 30 minutes with slow distillation of toluene. The hot solution is treated dropwise with water and the filtered toluene phase is steam distilled for three hours. The resulting aqueous phase is extracted with methylene chloride, dried and evaporated to give an oil which crystallizes, 17α-cyclopropyltestosterone, M.P. 158–159° C.

Example 3

Following the general procedures of Examples 1 and 2 an employing equivalent amounts of reactants, 11β-hydroxydehydroepiandrosterone,
6-methyldehydroepiandrosterone and
16β-methyldehydroepiandrosterone are converted by reaction with lithium cyclopropylbromide to the corresponding 17α-cyclopropyl-5-androstene-3β,11β,17β-triol,
17α-cyclopropyl-6-methyl-5-androstene-3β,17β-diol, and
17α-cyclopropyl-16β-methyl-5-androstene-3β,17β-diol which in turn are oxidized under Oppenauer conditions to yield, respectively, 17α-cyclopropyl-4-androstene-11β,17β-diol-3-one,
17α-cyclopropyl-6α-methyltestosterone, and
17α-cyclopropyl-16β-methyltestosterone.

Oxidation of 17α-cyclopropyl-4-androstene-11β,17β-diol-3-one with chromic acid in acetone gives 17α-cyclopropyl-4-androstene-3,11-dione-17-ol.

Example 4

To a solution of 0.46 g. of 9α-fluoro-11β-hydroxy-4-androstene-3,17-dione in 3 ml. of methanol near reflux under nitrogen is added 0.2 ml. of pyrrolidine. The solution is cooled and filtered to give 3-(N-pyrrolidinyl)-9α-fluoro-11β-hydroxy-3,5-androstadiene-17-one.

Lithium metal (0.69 g.) in 15 ml. of anhydrous ether is treated with 6.0 g. of cyclopropylbromide diluted with 10–20 ml. of anhydrous ether. After one hour reflux, the ether is removed by distillation and replaced with anhydrous tetrahydrofuran. To this solution is added dropwise 3.9 g. of the above 3-(N-pyrrolidinyl)-androstadiene in 100 ml. of tetrahydrofuran and the mixture is refluxed for 12 hours. The excess lithium metal is cautiously destroyed with several milliliters of cold methanol.

To the reaction mixture is then added a buffer solution consisting of 12 g. of sodium acetate in 40 ml. of water, 16 ml. of glacial acetic acid and 175 ml. of methanol. The mixture is refluxed for 30 minutes, cooled, diluted with water and extracted with chloroform. The chloroform extract is washed with dilute hydrochloric acid, then with sodium carbonate solution, finally with water, dried and evaporated to yield 17α-cyclopropyl-9α-fluoro-4-androstene-11β,17β-diol-3-one.

Example 5

Following the general procedure of Example 4 and employing equivalent amounts of reactants, 7α-methyl-4-androstene-3,17-dione,
6β-methyl-11β-hydroxy-4-androstene-3,17-dione, and
2α-methyl-11β-hydroxy-4-androstene-3,17-dione are converted to the corresponding 3-(N-pyrrolidinyl) enamine derivatives, reacted with lithium cyclopropylbromide to give the 17α-cyclopropyl-3-(N-pyrrolidinyl)-enamines which are cleaved with sodium acetate, acetic acid and methanol buffer to yield, respectively, 17α-cyclopropyl-7α-methyltestosterone,
17α-cyclopropyl-6α-methyl-4-androstene-11β,17β-diol-3-one, and
17α-cyclopropyl-2α-methyl-4-androstene-11β,17β-diol-3-one.

Example 6

A mixture of 1.0 g. of 17α-cyclopropyltestosterone (prepared as in Example 2), 0.8 g. of dichlorodicyanoquinone and 10 ml. of dioxane is refluxed with stirring for two hours. The reaction mixture is cooled, diluted with ether and the hydroquinone filtered and washed with ether. The filtrate is concentrated in vacuo to give 17α-cyclopropyl-1,4-androstadiene-17-ol-3-one.

Example 7

A mixture of 8.0 g. of 17α-cyclopropyltestosterone (prepared as in Example 2) and 100 ml. of acetic anhydride is refluxed for three hours, cooled and poured into ice water. The mixture is extracted with methylene chloride, washed with sodium carbonate until neutral, dried and evaporated to give 17α-cyclopropyltestosterone 17-acetate.

Similarly following the above general directions, 8.0 g. of 17α-cyclopropyltestosterone is reacted with propionic anhydride to give 17α-cyclopropyltestosterone 17-propionate.

What is claimed is:

1. A chemical compound of the formula:

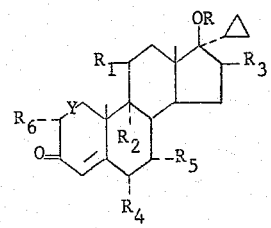

wherein:

Y is a member selected from the group consisting of a 1,2-single bond and a 1,2-double bond;

R is a member selected from the group consisting of hydrogen and acyl derived from a lower aliphatic carboxylic acid of from 2 to 4 carbon atoms;

$R_1$ is a member selected from the group consisting of hydrogen, hydroxy and keto;

$R_2$ is a member selected from the group consisting of hydrogen and fluoro; and $R_3$, $R_4$, $R_5$ and $R_6$ are members selected from the group consisting of hydrogen and methyl.

2. A chemical compound of the formula:

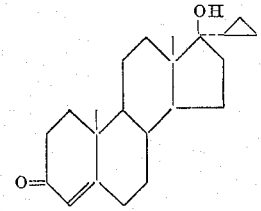

3. A chemical compound of the formula:

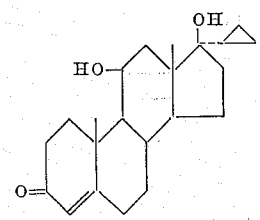

4. A chemical compound of the formula:

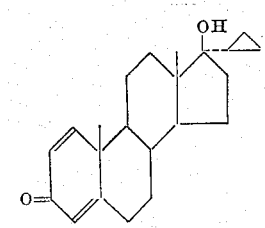

5. A chemical compound of the formula:

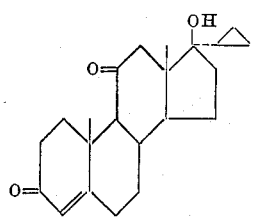

6. A chemical compound of the formula:

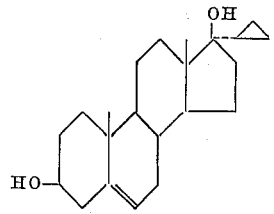

wherein R is acyl derived from a lower aliphatic carboxylic acid of from 2 to 4 carbon atoms.

7. A chemical compound of the formula:

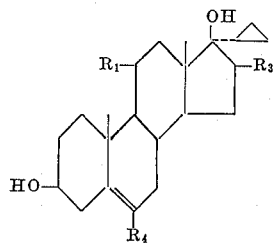

wherein:
R₁ is a member selected from the group consisting of hydrogen and hydroxy; and
R₃ and R₄ are members selected from the group consisting of hydrogen and methyl.

8. A chemical compound of the formula:

No references cited.

LEWIS GOTTS, *Primary Examiner.*
ELBERT L. ROBERTS, *Examiner.*

UNITED STATES PATENT OFFICE
CERTIFICATE OF CORRECTION

Patent No. 3,318,924            May 9, 1967

Vlasios Georgian

It is hereby certified that error appears in the above numbered patent requiring correction and that the said Letters Patent should read as corrected below.

Column 5, lines 18 to 28, for that portion of the formula reading $$\overset{\mathrm{OH}}{|} \quad\quad \text{read} \quad\quad \overset{\mathrm{OR}}{|}$$

Signed and sealed this 15th day of October 1968.

(SEAL)
Attest:

Edward M. Fletcher, Jr.
Attesting Officer

EDWARD J. BRENNER
Commissioner of Patents